US012590825B2

(12) United States Patent
Missotten et al.

(10) Patent No.: US 12,590,825 B2
(45) Date of Patent: Mar. 31, 2026

(54) CROP CONTAINER MONITORING

(71) Applicants: CNH Industrial Belgium N.V., Zedelgem (BE); CNH Industrial Italia S.p.A., Turin (IT); CNH Industrial America LLC, New Holland, PA (US)

(72) Inventors: Bart M. A. Missotten, Herent (BE); Luca Ferrari, Modena (IT); Cory Hunt, Millersville, PA (US); Geert Mortier, Ghent (BE); Luca Di Cecilia, Turin (IT); Fabio Lisurici, Matera (IT)

(73) Assignees: CNH Industrial Belgium N.V., Zedelgem (BE); CNH Industrial Italia S.p.A., Turin (IT); CNH Industrial America LLC, New Holland, PA (US)

( * ) Notice: Subject to any disclaimer, the term of this patent is extended or adjusted under 35 U.S.C. 154(b) by 76 days.

(21) Appl. No.: 18/598,453

(22) Filed: Mar. 7, 2024

(65) Prior Publication Data

US 2024/0302198 A1 Sep. 12, 2024

(30) Foreign Application Priority Data

Mar. 7, 2023 (EP) ..................................... 23160594

(51) Int. Cl.
*G01F 23/292* (2006.01)
*A01D 90/10* (2006.01)

(52) U.S. Cl.
CPC ........... *G01F 23/292* (2013.01); *A01D 90/10* (2013.01)

(58) Field of Classification Search
CPC .... A01D 41/127; A01D 43/087; A01D 90/10; G01F 23/192; G01F 23/292
(Continued)

(56) References Cited

U.S. PATENT DOCUMENTS

| | | | |
|---|---|---|---|
| 11,449,976 B2 * | 9/2022 | Sibley | ..................... G06V 20/20 |
| 11,653,590 B2 * | 5/2023 | Sibley | ................. A01M 7/0089 |
| | | | 700/283 |

(Continued)

FOREIGN PATENT DOCUMENTS

| | | | | |
|---|---|---|---|---|
| CA | 2753049 A1 * | 4/2012 | ............. | A01F 12/60 |
| CA | 3094523 A1 * | 9/2019 | ............. | A01C 7/105 |

(Continued)

OTHER PUBLICATIONS

European Search Report Corresponding to EP23160594 on Oct. 13, 2023.

*Primary Examiner* — Atul Trivedi
(74) *Attorney, Agent, or Firm* — Dority & Manning, P.A.

(57) ABSTRACT

A crop container monitor for monitoring a fill-state of an open-top crop container during a harvesting operation, the crop container monitor comprising: at least one radiation sensor positionable at an upper end of a wall of the open-top crop container to receive radiation from an interior of the open-top crop container; and a controller configured to: receive a sensing signal from the at least one radiation sensor, wherein the sensing signal is representative of the received radiation; determine a propagation distance from the at least one radiation sensor to a point from which the received radiation was scattered, reflected or emitted, based on the sensing signal; and output the fill-state of the open-top crop container based on the propagation distance.

20 Claims, 9 Drawing Sheets

(58) Field of Classification Search
USPC .......................................................... 701/50
See application file for complete search history.

(56) References Cited

U.S. PATENT DOCUMENTS

| | | | |
|---|---|---|---|
| 11,659,788 B2 * | 5/2023 | Puryk .................. | A01D 41/127 |
| | | | 414/467 |
| 2009/0044505 A1 | 2/2009 | Huster et al. | |
| 2014/0083556 A1 | 3/2014 | Darr et al. | |
| 2015/0177736 A1 * | 6/2015 | Anderson ........... | G05D 1/0242 |
| | | | 701/25 |
| 2016/0011024 A1 * | 1/2016 | Kirk ...................... | A01D 29/00 |
| | | | 73/861.73 |
| 2016/0150733 A1 | 6/2016 | Missotten et al. | |
| 2016/0223663 A1 * | 8/2016 | Schmalenberg ...... | G01S 17/931 |
| 2018/0314268 A1 * | 11/2018 | Tan ........................ | G05D 1/242 |
| 2020/0141784 A1 * | 5/2020 | Lange .................. | A01D 51/002 |
| 2020/0262428 A1 | 8/2020 | Fritz et al. | |
| 2021/0185885 A1 * | 6/2021 | Sibley .................. | A01B 69/001 |
| 2021/0192709 A1 * | 6/2021 | Sibley ................... | G06V 20/13 |
| 2021/0195840 A1 * | 7/2021 | Puryk ................... | A01D 90/10 |
| 2022/0015288 A1 * | 1/2022 | Christiansen .......... | A01D 90/10 |
| 2022/0018702 A1 * | 1/2022 | Christiansen ...... | A01D 41/1217 |
| 2022/0018955 A1 * | 1/2022 | Christiansen ........ | A01D 43/073 |
| 2022/0019238 A1 * | 1/2022 | Christiansen ........ | G05D 1/0257 |
| 2022/0019239 A1 * | 1/2022 | Christiansen ........ | A01D 43/087 |
| 2022/0019240 A1 * | 1/2022 | Christiansen ...... | A01D 41/1275 |
| 2022/0084236 A1 * | 3/2022 | Send ...................... | G06T 7/571 |
| 2022/0092814 A1 * | 3/2022 | Eberspach ............... | G06T 7/85 |
| 2022/0095539 A1 | 3/2022 | Faust et al. | |
| 2022/0101551 A1 * | 3/2022 | Eberspach ............... | G06T 7/70 |
| 2022/0197302 A1 | 6/2022 | McClelland et al. | |
| 2023/0113917 A1 * | 4/2023 | Sibley ....................... | G06T 7/73 |
| | | | 47/1.7 |
| 2023/0194326 A1 * | 6/2023 | Schroeder ............ | G01F 23/292 |
| | | | 460/1 |
| 2023/0243761 A1 * | 8/2023 | Somarowthu ........... | A01F 15/08 |
| | | | 701/50 |
| 2023/0309447 A1 * | 10/2023 | Wigdahl .............. | A01D 46/085 |
| | | | 701/50 |
| 2023/0320275 A1 * | 10/2023 | Christiansen ........ | G05D 1/0038 |
| | | | 701/50 |
| 2023/0324927 A1 * | 10/2023 | Christiansen .......... | A01D 90/10 |
| | | | 701/23 |
| 2024/0049635 A1 * | 2/2024 | Vandike ............... | A01D 41/127 |
| 2024/0260507 A1 * | 8/2024 | Romoser ............ | A01D 41/1217 |
| 2024/0302198 A1 * | 9/2024 | Missotten ............ | A01D 43/087 |

FOREIGN PATENT DOCUMENTS

| | | | | | |
|---|---|---|---|---|---|
| DE | 4426059 A1 * | 2/1996 | .......... | A01D 43/073 |
| EP | 3729949 A1 * | 10/2020 | ............ | A01D 90/12 |
| EP | 3811760 A1 * | 4/2021 | .......... | A01D 41/1275 |
| EP | 3939403 A1 * | 1/2022 | ........ | A01D 41/1275 |
| EP | 3939404 A1 * | 1/2022 | .......... | G01S 17/931 |
| EP | 3939405 A1 * | 1/2022 | .......... | A01D 43/073 |
| EP | 3939406 A1 * | 1/2022 | ........ | A01D 41/1278 |
| EP | 3939409 A1 * | 1/2022 | .......... | G01F 23/284 |
| EP | 3939410 A1 * | 1/2022 | .......... | A01D 43/087 |
| EP | 4427573 A1 * | 9/2024 | ............ | A01D 90/10 |
| WO | WO-2019173255 A1 * | 9/2019 | ........ | A01D 41/1275 |
| WO | WO-2019173256 A1 * | 9/2019 | ........ | A01D 41/1275 |
| WO | WO-2022033890 A1 * | 2/2022 | .......... | A01G 9/143 |
| WO | WO-2022130038 A1 * | 6/2022 | .......... | A01D 43/087 |
| WO | WO-2022130039 A1 * | 6/2022 | .......... | A01D 43/073 |

* cited by examiner

CROP CONTAINER MONITORING

CROSS-REFERENCE TO RELATED APPLICATIONS

The present application is based upon and claims the right of priority to EP patent application Ser. No. 23/160,594.0, having a filing date of Mar. 7, 2023, the disclosure of which is hereby incorporated by reference herein in its entirety for all purposes.

FIELD

The present disclosure relates to a crop container monitor for monitoring a fill-state of an open-top crop container and a method of monitoring a fill-state of an open-top crop container.

BACKGROUND

Agricultural harvesting machines may transfer crop material to an adjacent cart or trailer while continuing to harvest crops. For example, a combine harvester makes use of an internal grain tank or hopper for storing grains during harvesting. Once full, the contents of the tank can be transferred into a grain cart by means of an unloading tube. The grain cart may comprise a truck or a trailer pulled by a tractor. Similarly, a forage harvester may continually transfer foraged crop as it is processed to an adjacent truck or trailer via an unloading tube. A plurality of trucks or trailers may be operated in rotation to provide continuous unloading capability to the harvesting machine. For example, when a first truck is full it may leave the side of the harvesting machine and drive to a delivery point. A second truck or trailer may replace the first truck beside the harvesting machine to provide continuous unloading. The first truck may return to the harvesting machine when the second truck is full or nearly full.

At very high unloading flow rates spilling of crop happens very quickly. Therefore, accurate monitoring of the fill-state of the truck or trailer is desirable to avoid overflowing. Furthermore, driving the harvesting machine (and the truck) can be highly demanding as the driver needs to drive the harvesting machine in the field while controlling the direction of the unloading tube to accurately fill the trailer. Furthermore, the driver's view may be obscured by the presence of dust and particles usually suspended in air due to the ongoing harvesting operation.

The present disclosure provides a crop container monitor to accurately monitor the fill-state of a crop container (such as a truck or trailer) and improve crop unloading during harvesting operations.

SUMMARY

According to a first aspect of the present disclosure there is provided a crop container monitor for monitoring a fill-state of an open-top crop container during a harvesting operation, the crop container monitor comprising:

at least one radiation sensor positionable at an upper end of a wall of the open-top crop container to receive radiation from an interior of the open-top crop container; and a controller configured to:

receive a sensing signal from the at least one radiation sensor, wherein the sensing signal is representative of the received radiation;

determine a propagation distance from the at least one radiation sensor to a point from which the received radiation was scattered, reflected or emitted, based on the sensing signal; and output the fill-state of the open-top crop container based on the propagation distance.

The radiation sensor may comprise an electromagnetic radiation sensor. The electromagnetic radiation sensor may operate in one or more of: a visible, an ultra-violet and an infra-red region of the electromagnetic spectrum.

The open-top crop container may comprise a trailer or a truck for positioning adjacent to a harvesting vehicle during the harvesting operation to receive harvested crop from the harvesting vehicle.

The harvesting vehicle may comprise a harvesting machine or a grain cart.

The crop container monitor may comprise the open-top crop container. The at least one radiation sensor may be positioned at the upper end of the wall of the open-top crop container.

The fill-state may be representative of a crop distribution in the open-top crop container.

The controller may be configured to output the fill-state of the open-top crop container to one or more of:

an agricultural vehicle associated with the harvesting operation;

a user device; and a remote server or control centre.

The controller may be configured to:

receive a position and/or orientation of the open-top crop container relative to the harvesting vehicle and/or an unloading tube of the harvesting vehicle; and output a positioning state, representative of the relative position and/or orientation, with the fill-state.

The controller may be configured to:

determine if harvested crop in a portion of the container being filled exceeds a threshold height, based on the fill-state and the positioning state; and output a current filling status, representative of whether the harvested crop exceeds the threshold height, with the fill-state and the positioning state.

The controller may be configured to:

determine one or more control signals for controlling an agricultural vehicle associated with the harvesting operation based on the fill-state and the positioning state;

and output the control signals for controlling the agricultural vehicle.

The control signals may comprise any of: speed control signals; steering signals; and unloading tube control signals.

The agricultural vehicle may comprise any of: the harvesting vehicle, a harvesting machine performing the harvesting operation, a tractor pulling a trailer comprising the open-top crop container or a truck comprising the open-top crop container.

The controller may be configured to: receive crop position data from a crop position sensor associated with the harvesting operation; and estimate a rate of filling of the container based on a rate of change of the fill-state; output the rate of filling with corresponding crop position data.

The at least one radiation sensor may comprise a radiation transceiver configured to:

emit a radiation signal; and receive the radiation signal reflected back towards the radiation transceiver, wherein the controller is configured to determine the propagation distance based on a time of flight of the radiation signal.

The crop container monitor may further comprise the open-top crop container. The radiation transceiver may be positioned at an upper end of a first wall of the open-top crop container and configured to emit the radiation signal towards a second wall of the open-top crop container opposite the first wall.

The open-top crop container may comprise a trailer or a truck for positioning adjacent to a harvesting vehicle during the harvesting operation to receive harvested crop from the harvesting vehicle. The first wall or the second wall may be a front wall of the trailer or truck; and the other one of the first wall or the second wall may be a rear wall of the trailer or truck.

The radiation transceiver may be positioned at an end of the first wall connecting to a third wall of the open top crop container, wherein the third wall extends between the first wall and the second wall.

The radiation transceiver may comprise a laser transceiver.

The radiation transceiver may comprise an ultrasonic transceiver, a lidar transceiver or a radar transceiver.

The at least one radiation sensor may further comprise a second radiation transceiver positioned at an upper end of the second wall and configured to emit a second radiation signal towards the first wall and receive the second radiation signal reflected back towards the second radiation transceiver. The second radiation transceiver may be positioned at the end of the second wall connecting to the third wall. The controller may be configured to determine a second propagation distance based on a time of flight of the second radiation signal and determine the fill-state based on the second propagation distance.

The second radiation transceiver may comprise a laser transceiver.

The second radiation transceiver may comprise an ultrasonic transceiver, a lidar transceiver or a radar transceiver.

The at least one radiation sensor may further comprise a third radiation transceiver positioned at an upper end of the first wall or the second wall and configured to emit a third radiation signal towards the other one of the first wall and the second wall and receive the radiation signal reflected back towards the third radiation transceiver. The third radiation transceiver may be positioned at an end of the first wall or the second wall connecting to a fourth wall opposite the third wall, wherein the fourth wall extends between the first wall and the second wall. The controller may be configured to determine a third propagation distance based on a time of flight of the third radiation signal and determine the fill-state based on the third propagation distance.

The third radiation transceiver may comprise a laser transceiver.

The third radiation transceiver may comprise an ultrasonic transceiver, a lidar transceiver or a radar transceiver.

The at least one radiation sensor may further comprise a fourth radiation transceiver positioned at an upper end of whichever of the first wall and second wall is opposite the wall on which the third radiation transceiver is positioned, to emit a fourth radiation signal towards the other one of the first wall and the second wall and receive the radiation signal reflected back towards the fourth radiation transceiver. The fourth radiation transceiver may be positioned at an end of the first wall or the second wall connecting to the fourth wall. The controller may be configured to determine a fourth propagation distance based on a time of flight of the fourth radiation signal and determine the fill-state based on the fourth propagation distance.

The fourth radiation transceiver may comprise a laser transceiver.

The fourth radiation transceiver may comprise an ultrasonic transceiver, a lidar transceiver or a radar transceiver.

The controller may be configured to: receive harvester positioning data from a positioning sensor associated with the harvesting vehicle and container positioning data from a positioning sensor associated with the open-top crop container; and estimate a position and/or orientation of the open-top crop container relative to the harvesting vehicle and/or an unloading tube of the harvesting vehicle, based on the harvester positioning data and the container positioning data; and output a positioning state representative of the relative position and/or orientation.

The controller may be configured to: determine control signals for controlling an agricultural vehicle associated with the harvesting operations based on the fill-state and the positioning state; and output the control signals to the agricultural vehicle.

The harvester positioning data may comprise unloading tube positioning data. The positioning data may comprise GPS data.

The crop container monitor may further comprise a first position sensor positioned on the container. The controller may be configured to receive container positioning data from the first position sensor. The crop container monitor may further comprise a second position sensor positioned on the container and spaced apart from the first position sensor. The controller may be configured to receive the container positioning data from the first position sensor and the second position sensor.

The first position sensor may comprise a GPS sensor. The second position sensor may comprise a GPS sensor.

The at least one radiation sensor may comprise a first radiation sensor and a second radiation sensor. The controller may be configured to:

determine a range profile of the open-top crop container based on a first sensing signal from the first radiation sensor, a second sensing signal from the second radiation sensor and relative positions of the first radiation sensor and the second radiation sensor on the open-top crop container; and output the fill-state based on the range profile.

The range profile may comprise a stereo profile representing distances to a plurality of points from which the first and second radiation signals are received.

The controller may be configured to combine the first sensing signal and the second sensing signal to provide a combined sensing signal.

The controller may be configured to estimate a crop distribution in the open-top crop container based on the range profile and output the fill-state based on the crop distribution.

The controller may be configured to estimate a crop spillage outside the open-top crop container based on the range profile and output the crop spillage as part of the fill-state.

The controller may be configured to estimate a crop flow impact point based on the range profile and output the crop flow impact point as part of the fill-state.

The controller may be configured to estimate a position of a crop flow based on the range profile and output the position of the crop flow impact point as part of the fill-state.

The range profile may comprise a 3D point cloud or a range image.

The first and second radiation sensors may comprise any of: a LiDAR transceiver, a RADAR transceiver, an ultrasonic transceiver, a stereo camera or a camera.

The first and second radiation sensors may comprise a camera or a stereo camera operating at a visible and/or infrared wavelength.

The crop container monitor may further comprise the open-top crop container. The first radiation sensor may be positioned at an upper end of a wall of the open-top crop container and the second radiation sensor may be positioned at an upper end of a wall of the open-top container such that the first radiation sensor is spaced apart from the second radiation sensor.

The open-top crop container may comprise a trailer or a truck for positioning adjacent to a harvesting vehicle during the harvesting operation to receive harvested crop from the harvesting vehicle. The first radiation sensor and the second radiation sensor may be positioned on the open-top crop container to provide a field of view, of the first radiation sensor and the second radiation sensor, for capturing a portion of the harvesting vehicle during the harvesting operation. The controller may be configured to:

determine a range profile of the open-top crop container and the portion of the harvesting vehicle;
    estimate a position and/or orientation of the open-top crop container relative to the harvesting vehicle and/or an unloading tube of the harvesting vehicle, based on a position of the harvesting machine in the range profile; and
    output a positioning state representative of the relative position and/or orientation.

The controller may be configured to:

determine control signals for controlling an agricultural vehicle associated with the harvesting operations based on the fill-state and the positioning state; and
    output the control signals to the agricultural vehicle.

The crop container monitor may further comprising one or more targets for positioning on the portion of the harvesting vehicle. The controller may be configured to estimate the position and/or orientation of the open-top crop container relative to the harvesting vehicle based on a position of the one or more targets in the range profile.

According to a second aspect of the present disclosure there is provided a method of monitoring a fill-state of an open-top crop container, the method comprising:

receive a sensing signal from at least one radiation sensor positioned at an upper end of a wall of the open-top crop container, wherein the sensing signal is representative of radiation received from an interior of the open-top crop container;
    determining a propagation distance from the at least one radiation sensor to a point from which the received radiation was scattered, reflected or emitted, based on the sensing signal; and
    outputting a fill-state of the open-top crop container based on the propagation distance.

According to a third aspect of the present disclosure there is provided a crop container monitor for monitoring a position state of an open-top crop container during a harvesting operation, the crop container monitor comprising:

an open-top crop container comprising a trailer or a truck for positioning adjacent to a harvesting vehicle during the harvesting operation to receive harvested crop from the harvesting vehicle;
    a first radiation sensor positioned at an upper end of a wall of the open-top crop container and a second radiation sensor positioned at an upper end of a wall of the open-top container such that the first radiation sensor is spaced apart from the second radiation sensor, the first radiation sensor and the second radiation sensor comprising a field of view for capturing a portion of the harvesting vehicle during the harvesting operation; and a controller configured to:

determine a range profile of the open-top crop container and the portion of the harvester based on a first sensing signal from the first radiation sensor, a second sensing signal from the second radiation sensor and relative positions of the first radiation sensor and the second radiation sensor on the open-top crop container; and
    estimate a position and/or orientation of the open-top crop container relative to the harvesting vehicle and/or an unloading tube of the harvesting vehicle, based on a position of the harvesting vehicle in the range profile; and
    output a positioning state representative of the relative position and/or orientation. There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION

Figure 1:
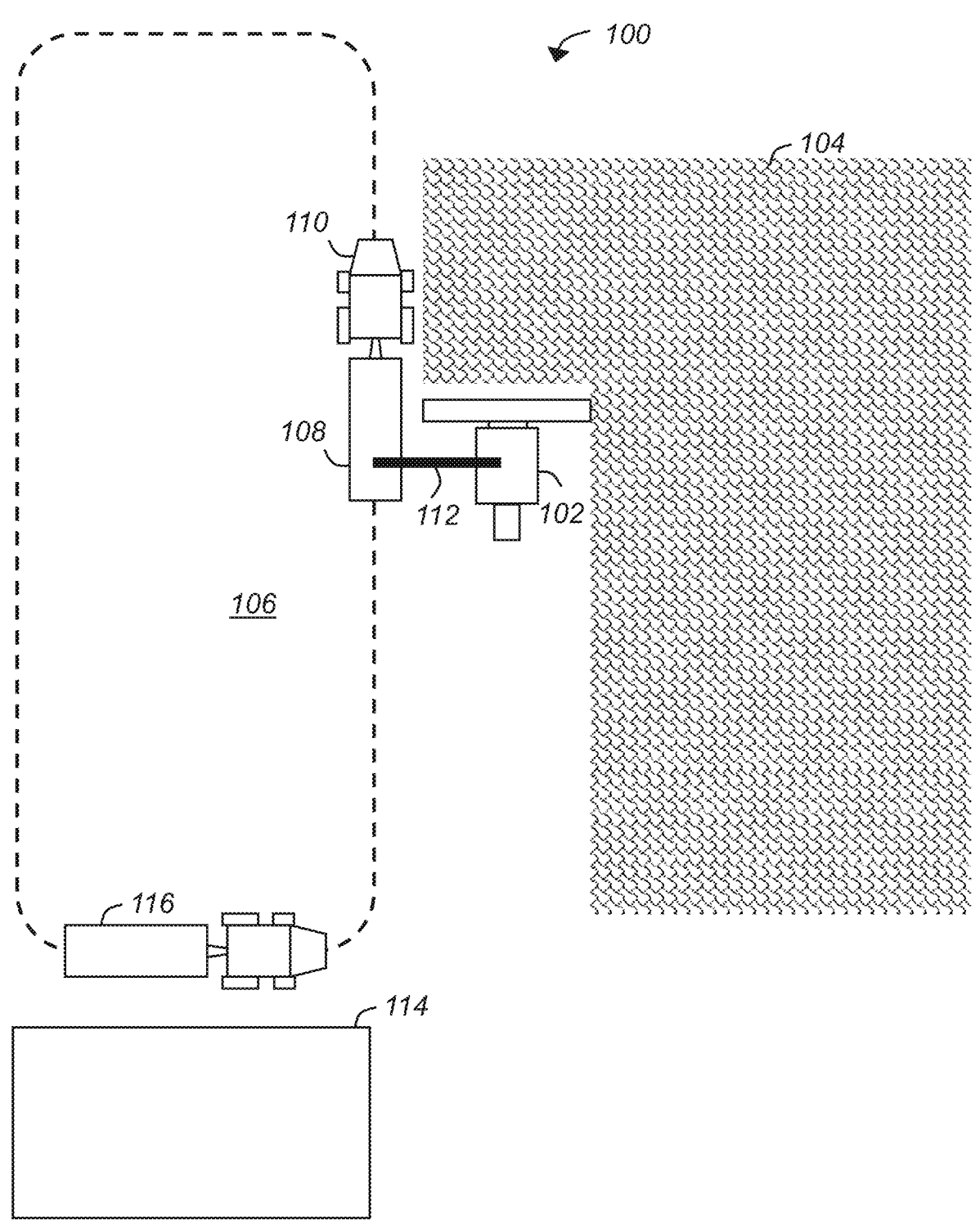
FIG. 1 illustrates a harvesting machine performing a harvesting operation in a field.

FIG. 1 illustrates a harvesting machine 102 (which is an example of a harvesting vehicle), for example a combine harvester or a forage harvester, performing a harvesting operation in a field 100. The harvesting machine 102 harvests crops from a crop area 104 leaving behind a harvested crop area 106 in portions of the field 100 already harvested. The harvesting machine 102 may unload harvested crop into a mobile open-top crop container 108, which may be referred to herein as a container 108. In this example, the harvesting machine 102 unloads the harvested crop to the container 108 using an unloading tube 112 of the harvesting machine 102. In the case of a forage harvester, the unloading tube is also called spout. The container 108 may be positioned in an unloading position adjacent to the moving harvesting machine 102. The unloading position may be a relative position adjacent to the moving harvesting machine 102 such that the container 108 moves in a parallel direction to, and at the same speed as, the harvesting machine 102.

The unloading may happen continuously, for example for a forage harvester, or intermittently, for example when a grain hopper of a combine harvester is full. In this example the container 108 comprises a trailer towed by a tractor 110. In other examples, the container may comprise an open-top truck. Once the container 108 is full, the truck or tractor 110 may depart from travelling adjacent to the harvesting machine 102 and return to a delivery point 114. The delivery point 114 may comprise a crop store or a heavy goods vehicle for transporting the harvested crop onwards, for example. A second open-top crop container 116 may replace the first container 108 in the unloading position. The harvesting machine 102 may temporarily suspend the crop unloading after the first container 108 departs until the second open-top crop container 116 is in the unloading position.

In some examples, the unloading may occur such that the container 108 is filled from a front of the container 108 to a rear of the container, or vice versa. For example, when a first portion of the container 108 at the front of the container 108 is full, a driver of the tractor 110 or harvesting machine 102 may temporarily adjust a speed of their vehicle to adjust the unloading position rearwards accordingly. Alternatively, or in addition, the driver of the harvesting machine 102 may adjust a position of the unloading tube 112 for the same purpose.

To provide the controlled filling of the container 108 and/or determine when the container 108 is full, knowledge of a fill-state of the container 108 is required. Therefore, a crop container monitor may monitor the filling of the container 108. For example, a sensor may be placed on the unloading tube 112 and monitor the fill-state of the crop. However, such sensors can be obscured by a dispersive flow of crop being dropped or blown into the open-top crop container 108. Fill level sensing of containers 108 can also be complicated by dusty conditions and can require high resolution and accurate estimation of the crop level in the container 108 with reference to the edge of the container 108.

Figure 2:
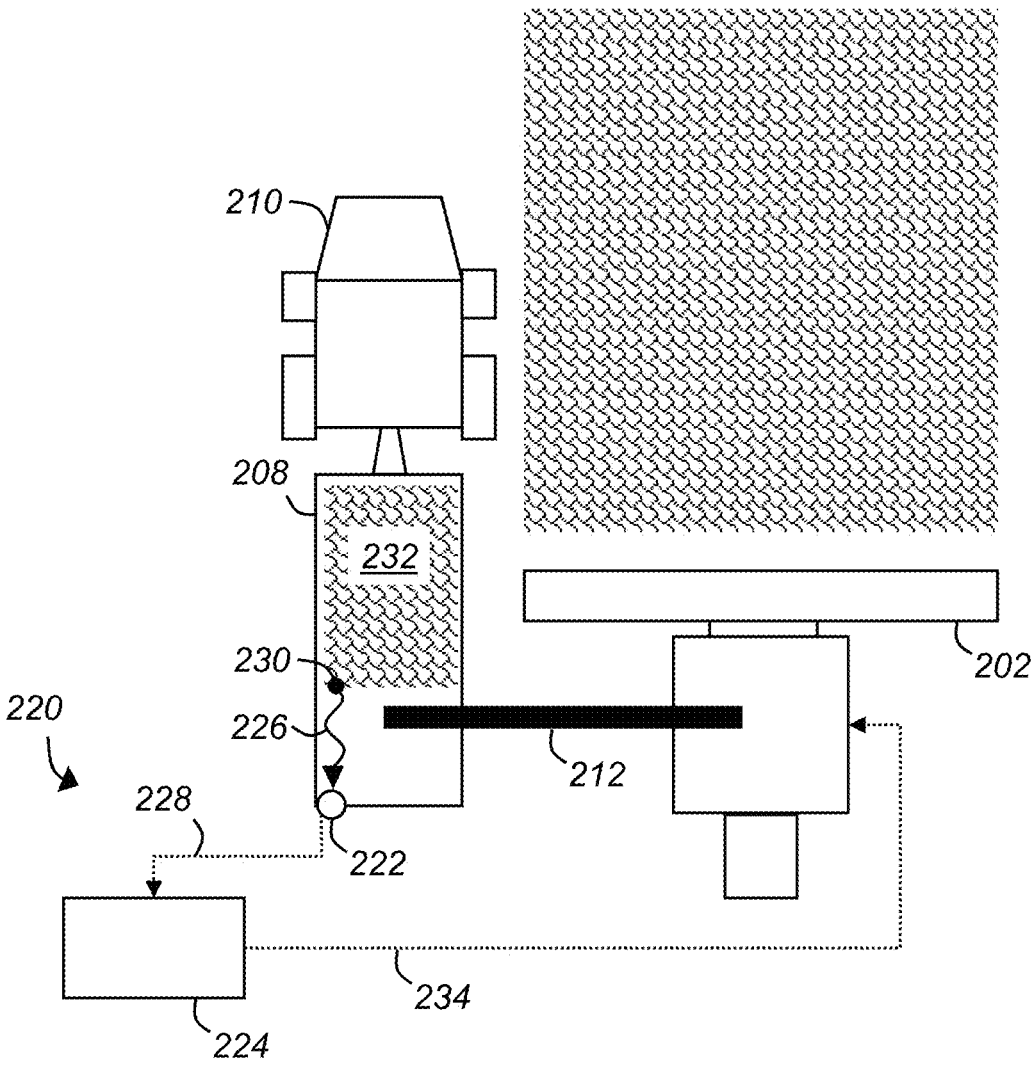
FIG. 2 illustrates a crop container monitor for monitoring a fill-state of an open-top crop container during a harvesting operation according to an embodiment of the present disclosure.

FIG. 2 illustrates a crop container monitor 220 for monitoring a fill-state of an open-top crop container 208 during a harvesting operation according to an embodiment of the present disclosure. Features of FIG. 2 that are also present in FIG. 1 have been given corresponding numbers in the 200 series and will not necessarily be described again here.

The crop container monitor 220 comprises a radiation sensor 222 positioned at an upper end of a wall (a front wall, a rear wall or a sidewall) of the container 208. The radiation sensor 222 is positioned to receive radiation 226 from an interior of the container 208. The crop container monitor 220 further comprises a controller 224. The controller 224 receives a sensing signal 228 from the radiation sensor 222 that is representative of radiation 226 received by the radiation sensor 222. The controller 224 determines a propagation distance from the sensor 222 to a point 230 from which the received radiation 226 was scattered or reflected based on the sensing signal 228. For example, the controller 224 may determine the propagation distance using a time of flight measurement or stereo triangulation, as discussed further below. The controller 224 determines and outputs the fill-state 234 of the container 208 based on the propagation distance. In this example, the container 208 is being filled from front to back. The reflection point 230 corresponds to a peak of collected crop 232 exceeding a threshold height relative to the top of the walls of the container 208. In this way, the propagation distance can provide an indication of how much unfilled space remains towards the rear of the container 208. In this example, the controller 208 outputs the fill-state 234 of the container 208 to the harvesting machine 202. Alternatively, or in addition, the controller 208 may output the fill-state 234 to the tractor 210/truck, a user device or a remote server or control centre.

Providing a crop container monitor 220 with sensors for positioning on the container 208 can advantageously provide a more accurate estimation of fill-state because the sensor view is not obscured by a flow and dispersion of harvested crop from the unloading tube 212. Furthermore, by relying on a distance measurement, the monitor 220 can employ wavelengths or combinations of wavelengths of radiation that are insensitive or less sensitive to dust produced by the harvesting operation. The crop container monitor can advantageously estimate the crop distribution in the controller in real-time. The crop container monitor can advantageously improve crop container filling during harvesting operations by reducing spillage of crop outside the container and enabling automated filling.

The fill-state 234 may represent a spatial distribution of harvested crop in the container 208. In some examples (such as the laser based time of flight examples discussed below), the fill-state may comprise a one-dimensional or two-dimensional distribution indicating: (i) a portion of the container, between the sensor 222 and the reflection point 230, that is not full; and (ii) a portion of the container, from the reflection point 230 to a wall opposite the wall on which the sensor 222 is positioned, that is full. In some examples (such as the 3D LiDAR examples discussed below in relation to FIGS. 4 to 8), the fill-state 234 may comprise a two-dimensional or three-dimensional distribution of the harvested crop 232 in the container 208.

In some examples, the controller 224 may output the fill-state as an indication signal for indicating the fill-state of the container to an operator, such as a driver of the tractor 210 (or truck) and/or the harvesting machine 202. The indication signal may be suitable for display on a display screen of the tractor 210 (or truck) and/or the harvesting machine 202. For example, the indication signal may be displayed as the propagation distance and/or a visual graphic representing the spatial distribution of the harvested crop 232 in the container 208. The indication signal may alternatively, or additionally, comprise a visible, audible or haptic indication or alert, for example to alert the driver of the tractor 210 (or truck) and/or harvesting machine 202 that the fill-state indicates that a portion of the container 208 currently being filled is full (or nearly full) and that the unloading position of the container 208 requires adjustment.

In some examples, the controller 224 may determine and output one or more control signals for controlling an agricultural vehicle associated with the harvesting operation, based on the fill-state 234. For example, if the fill-state 234 indicates that the portion of the container 208 currently being filled has reached a level exceeding the threshold height, the controller 224 may determine and output a control signal for manipulating the agricultural vehicle to change the relative unloading position of the container 208. The agricultural vehicle may comprise any of: the harvesting machine 202, the tractor 210 towing the container 208 or a truck comprising the container 208.

The one or more control signals may comprise one or more of: speed control signals, for example a throttle control signal or a brake control signal, for temporarily adjusting a speed of the harvesting machine 202 and/or truck/tractor 210 to adjust the relative unloading position of the container 208; steering signals for steering the harvesting machine 202 and/or truck/tractor 210 to adjust a lateral separation of the harvesting machine 202 and/or truck/tractor 210; and unloading tube control signals for adjusting a position of the unloading tube 212. The controller 224 may output the one or more control signals to a control system of the agricultural vehicle.

The controller 224 may receive or estimate (or determine) a position and/or orientation of the container 208 relative to the harvesting machine 202 and/or unloading tube 212. The controller 224 may use the relative position and/or orientation for estimating a portion of the container 208 being filled, for outputting with the fill-state and/or for determining the one or more control signals.

In some examples (such as the examples, described in relation to FIGS. 4 to 8), the controller 224 may estimate the position and/or orientation of the container 208 relative to the harvesting machine 202 and/or unloading tube 212 based on the sensing signal 228 output by the at least one radiation sensor 222. The controller 224 may output a positioning state representative of the relative position and/or orientation together with the fill-state. For example, the controller 224 may output the positioning state to the agricultural vehicle for display on the display screen.

In some examples, the crop container monitor 220 may include one or more position sensors, such as a GPS sensor, positionable on the container. Including two or more spaced apart position sensors can enable estimation of the orientation of the container with a single measurement. However, the orientation may also be estimated by monitoring the change in position over time of one position sensor on the container. In some examples, the truck/tractor 210 may comprise a position sensor. The controller 224 may receive container positioning data from the one or more position sensors of the crop container monitor 220 and/or the truck/tractor 210. The controller 224 may also receive harvester position data from a position sensor on the harvesting machine 202. The controller 224 may also receive tube position data from a position sensor on the unloading tube 212. The controller 224 may output the container positioning data, the harvester positioning data and/or the tube positioning data to the truck/tractor 210 and/or harvesting machine 202 with the fill-state 234, for example for display on the display screen. The controller 224 may estimate a position and/or orientation of the container 208 relative to the harvesting machine 202 and/or unloading tube 212 based on the container positioning data and the respective harvester positioning data and/or tube positioning data. The controller 224 may output a positioning state representative of the relative position and/or orientation with the fill-state. For example, the controller 224 may output the positioning state to the agricultural vehicle for display on the display screen.

It will be appreciated that the controller 224 may receive or estimate the position and/or orientation of the container 208 relative to the harvesting machine 202 and/or unloading tube 212 in other ways. For example, the controller 224 may receive operational signals (position, speed, bearing, unloading tube position etc.) from a control system of the harvesting machine 202 and/or the tractor 210 or truck. The controller 224 may also receive positioning and trajectory data of the harvesting machine 202 and/or tractor 210 or truck from an external monitor such as an unmanned aerial vehicle (UAV) monitoring the harvesting operation. It will further be appreciated that in some examples, for example, the examples of FIGS. 4 to 8, the controller 234 may estimate and output the position state without determining and outputting the fill-state.

The controller 224 may determine, based on the fill-state and the positioning state, if the harvested crop 232 in a portion of the container 208 being filled exceeds a threshold height. The controller 224 may output a current filling status representative of whether the harvested crop 232 exceeds the threshold height with the fill-state and/or the positioning state, for example to the agricultural vehicle.

The controller 224 may determine the one or more control signals for controlling the agricultural vehicle (truck/tractor 210 and/or harvesting machine 202) based on the crop distribution in the container 208, as indicated by the fill-state 234, and the positioning state. For example, the controller 224 may determine the one or more control signals based on the current filling status. If the current filling status indicates that the portion of the container being filled is full, the controller may output the one or more control signals to adjust the relative position and/or orientation of the container to the harvesting machine 202 and/or unloading tube 212.

In some examples, the controller 224 may receive crop position data from a crop position sensor associated with the harvesting operation. The crop position sensor may be positioned on the container 208 or a vehicle associated with the harvesting operation (e.g. the harvesting machine 202, the tractor 210 or a UAV). The crop position data can represent position data of the crop in the field currently being harvested by the harvesting machine. In some examples, the controller 224 may record the crop position data with a corresponding unloading position or a corresponding portion of the container 208 being filled. In some examples, the controller 224 may perform a differential measurement to estimate a rate of filling of the container 208 and record the rate of filling with the crop position data. In this way, portions of the harvested crop in the container and/or a rate of filling of the portions can be geo-referenced to the position in the field from which the crop was harvested. This can advantageously provide yield mapping of the crop harvested from the field.

It will be appreciated that depending upon implementation the controller 224 may be positioned in different locations. In some examples, the controller 224 may be co-located with the radiation sensor 222. In some examples, the controller 224 may be associated with an agricultural vehicle associated with the harvesting operation. For example, the controller 224 may form part of the tractor 210 towing the container 208 or the controller 224 may form part of the harvesting machine 202. In some examples, the controller 224 may be located at a remote control centre or a server. In some examples, the functions of the controller 224 may be distributed over a number of processors at different locations.

For example, some functionality of the controller 224, such as estimating the propagation distance, may be performed by a first processor co-located with the sensor 222, whereas other functionality, such as estimating the fill-state or determining the control signals for the agricultural vehicle, may be performed by a second processor forming part of the harvesting machine 202. Therefore, the term controller 224 should be interpreted as encompassing one or more processors which may be located separately. It will further be appreciated that the controller 224, or processors thereof, may communicate through wired or wireless means with the sensor 222, other processors and/or the control systems of the truck/tractor and/or harvesting machine 202.

Figure 3:
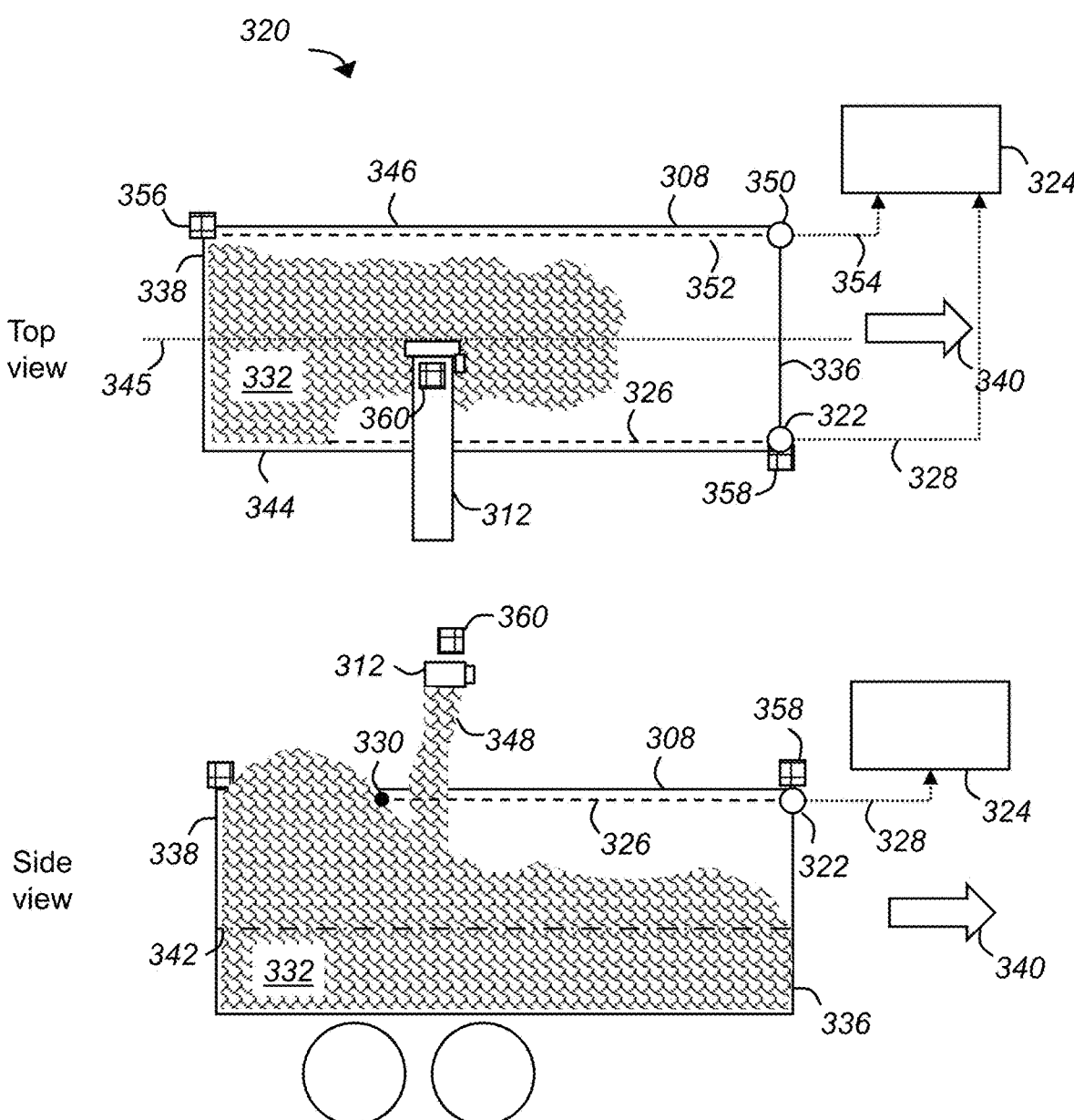
FIG. 3 illustrates a further crop container monitor for monitoring a fill-state of an open-top crop container during a harvesting operation according to an embodiment of the present disclosure.

FIG. 3 illustrates a further crop container monitor 320 for monitoring a fill-state of an open-top crop container 308 during a harvesting operation according to an embodiment of the present disclosure. Features of FIG. 3 that are also present in FIG. 1 or FIG. 2 have been given corresponding numbers in the 300 series and will not necessarily be described again here. A top portion of FIG. 3 illustrates a top view of the monitor 320 and a bottom portion of FIG. 3 illustrates a side view of the monitor 320. In this example, the container 308 comprises a trailer for towing with a tractor (not shown).

In this example, the radiation sensor 322 comprises a first laser transceiver 322. The first laser transceiver 322 is positioned at an upper end of a first wall 336 of the container 308. In some examples, the first laser transceiver 322 (or any radiation sensors disclosed herein) may be positioned on a top edge of the first wall 336. In other examples, the first laser transceiver 322 (or any radiation sensors disclosed herein) may be positioned a fixed distance below the top edge of the first wall 336. The vertical position (or height (with respect to a ground surface)) of the first laser transceiver 222 may define a threshold height, or a fill height, above which a relevant portion of the container 308 is considered full. The first laser transceiver 322 may be positioned to emit a radiation signal (or light beam) in a substantially horizontal direction, with respect to a normal orientation of the container 308 when in operation on a flat ground surface (e.g., as shown in the lower portion of FIG. 3).

The first laser transceiver 322 comprises a laser emitter capable of emitting a first radiation signal towards a second wall 338 of the container 308, opposite the first wall 336. The first laser transceiver 322 further comprises a laser receiver capable of receiving/detecting the first radiation signal reflected back towards the first laser transceiver 322. The first laser transceiver 322 may comprise a laser distance measurement sensor such as a laser range finder or a laser time of flight monitor. Laser distance measurement sensors can be very powerful and can advantageously regulate an intensity of the first radiation signal 326 based on a magnitude of the reflected signal, such that even if a lens or optic is covered with dust (which can be common in the dusty environment produced during harvesting operations), accurate measurements can still be made.

The first laser transceiver 322 outputs a sensing signal 328, indicative of the reflected radiation signal 326, to the controller 324. The controller 324 determines a propagation distance between the laser transceiver 322 and the point of reflection 330. The controller 324 may determine the propagation distance by using a time of flight process. For example, the first laser transceiver 322 may emit laser pulses or a modulated radiation signal. The controller 324 may monitor the temporal characteristics of the reflected signal 326 (as indicated by the sensing signal 328), such as a leading edge time of a laser pulse or a phase of a modulated signal, to determine the time of flight.

In this example, the first wall 336 is a front wall of the container 308 with respect to a forward direction of travel (as indicated by arrow 340) of the container 308. The illustrated arrangement, with the first laser transceiver 322 positioned on the front wall 336 of the container 308 may be suitable for a "rear to front" filling process, wherein the unloading tube moves in a step-wise fashion from the rear of the container 308 to the front of the container (controlled by either a relative speed of the harvester 302 and container 308 and/or the position of the unloading tube 312). In some examples, the harvesting operation may include unloading a base level 342 of harvested crop 332 along the length of the container 308. This can provide sufficient traction for the tractor pulling the trailer 308. In this base level filled state (or in an empty state with no base-level filling (e.g. for a truck)), the radiation signal 326, emitted from the first laser transceiver 322, can traverse the full length of the container 308 and reflect from the rear wall 338. As a result, the controller 324 can determine a propagation distance equal to the length of the container 308, which in this example is 7 metres. The unloading position of the container 308 may then be controlled (manually by an operator or automatically via control signals from the controller 324) such that the unloading tube 312 is positioned at the rear of the container 308. As a rear portion of the container 308 (e.g., a portion within a predefined distance of the rear wall 338, such as within 1 metre) continues to receive harvested crop from the unloading tube 312, eventually a pile of the harvested crop 332 in the rear portion will exceed the threshold height and interrupt the radiation signal 326. As a result, the point of reflection 330 moves forward from the rear wall 338 to the pile of harvested crop 332, which in this example is 5 metres. The controller 324 determines the new propagation distance and outputs the fill-state accordingly. The controller 324 may output the fill-state and/or control signals to the truck/tractor and/or harvester (as described above) and the unloading position of the container 308 may be adjusted manually or automatically such that the unloading tube moves forward towards the front wall 336. The process may continue until the propagation distance indicates that a front portion of the container 308 is full (the pile of harvested crop 332 exceeds the threshold height at a portion of the container 308 within a predefined distance of the front wall). At this point, the controller 324 can output a fill-state indicating that the container 308 is completely full and requires replacement.

Although "rear to front" filling is illustrated and described, it will be appreciated that in other embodiments, the first laser transceiver 322 may be positioned on the rear wall 338 and directed towards the front wall 336, to support a corresponding "front to rear" process.

In some examples, the crop container monitor 320 may comprise a second laser transceiver (not shown) positioned on the rear wall 338 in addition to the first laser transceiver 322 on the front wall 326. The second laser transceiver may emit a second radiation signal towards the front wall 326 and receive a second radiation signal reflected back towards the second laser transceiver. The second laser transceiver may output a second sensing signal, indicative of a second propagation distance, to the controller 324, in the same way as described above. In some examples, the controller 324 may selectively enable the first laser transceiver 322 or the second laser transceiver depending on whether the harvesting operation comprises a "front to rear" or "rear to front" process. In some examples, the controller 324 may receive sensing signals from both laser transceivers and determine whether the harvesting operation comprises a "front to rear" or "rear to front" process based on the sensing signals. For example, if the sensing signal 328 from the first laser transceiver 322 indicates a propagation distance of 0 metres (or less than a threshold) while the second laser transceiver indicates a greater propagation distance (e.g. greater than a threshold), the controller 324 may determine that a front portion of the container 308 has been filled first and the harvesting operation is "front to rear." In yet further examples, the harvesting operation may comprise filling from the middle (as viewed along the length of the container). The controller 324 may receive sensing signals from both the first and second laser transceiver to monitor the fill-state of the container 308 either side of the pile of harvested crop 332 in the middle of the container 308.

The first laser transceiver 322 may be positioned at an end of the front wall 336 connected to a third wall 344 (or a fourth wall 346) of the container 308. The third and fourth walls 344, 346 comprise opposing sidewalls extending between the first and second walls 336, 338. In this example, the first laser transceiver 322 is positioned adjacent to the third wall 344 such that the radiation signal runs along a third edge of the container 308 (at the top of the third wall 344). Monitoring a side edge of the container 308 (at the upper end of the respective third/fourth wall 344, 346) can advantageously provide a radiation signal path 326 that avoids a crop flow 348 falling from the unloading tube 312 (which could result in measurement errors), which is typically positioned towards a centreline 345 (running from the front wall 336 to the rear wall 338) of the container 308. Furthermore, monitoring a side edge along a sidewall 344, 346 at the upper end of the sidewall provides a useful level for indicating that the relevant portion of the container is full. This is because the height of the pile of harvested crop 332 at the centreline 345 is typically higher than the height of the top of the walls 336, 338, 344, 346 with a typical dome-shaped cross-section reducing in height towards the third and fourth sidewalls 344, 346. The edge monitoring approach uses a laser distance measurement beam(s) along the horizontal upper side edge(s) of the container 308—once the light or laser beam is obscured or reflected by the harvested crop 332, the controller 324 can determine that the pile of harvested crop 332 has reached close enough to the edge of the trailer 308 and that the unloading should move to another point (more forward or rearward in the trailer).

In examples comprising a second laser transceiver, the second laser transceiver may be positioned adjacent to the same sidewall as the first laser transceiver 322, such that both the first and second laser transceivers monitor the same edge. The first and second laser transceivers may be considered as a first laser transceiver pair monitoring the same edge.

In this example, the crop container monitor 320 comprises a third laser transceiver 350 positioned at an end of the first wall connected to the fourth wall 346 of the container 308. In this example, the third laser transceiver 350 is positioned on the same wall (the front wall 336) as the first laser transceiver 322, however in other examples the third laser transceiver may be positioned on the opposite wall (the rear wall 338) to the first laser transceiver 322. The third laser transceiver 350 emits a third radiation signal 352 towards the rear wall 338 and receives the third radiation signal 352 reflected back towards the third laser transceiver 350. The third laser transceiver 350 provides a third sensing signal 354 representative of the third radiation signal 352 to the controller 324. The controller 324 can determine a third propagation distance based on the third sensing signal 354. The controller 324 may determine the fill-state of the container 308 based on the first and third propagation distances.

Providing an additional third laser transceiver 350 monitoring a fourth edge of the container 308 advantageously provides information about a lateral position of the pile of harvested crop 332. The lateral position of the pile may deviate from the centreline 345 because of misalignment of the unloading tube 312 and/or wind blowing the crop flow 346 in a particular direction. The controller 308 may determine a lateral distribution of the pile of harvested crop 332 based on the first and third propagation distances. In the example shown, the first radiation signal 326 is reflected from the pile of crop and indicates a first propagation distance (~5 metres) less than the length of the container 308. The path of the third radiation signal 352 is uninterrupted and reflects from the rear wall 338 indicating a third propagation distance (~7 metres) equal to the length of the container 308. The controller 308 can determine that a lateral position of a peak of the pile of harvested crop 332 deviates from the centreline 345 or is biased towards the third wall 344, based on the discrepancy in the first and third propagation distances. The controller 324 may output the lateral position of the peak of the pile as part of the fill-state or as a separate signal. A lateral position of the unloading tube (a position in a direction perpendicular to the direction of travel of the harvesting machine and container 308) may be adjusted (automatically via control signals from the controller 324, or manually by an operator) such that the peak moves back towards the centreline 345 in response to the information in the fill-state.

In the same way that the first and second laser transceivers can form a first pair of laser transceivers monitoring a first edge of the container 308, the crop container monitor 320 may comprise a fourth laser transceiver positioned opposite the third laser transceiver 350, such that the third and fourth laser transceivers form a second laser transceiver pair monitoring a second edge of the container 308. The fourth laser transceiver may operate in the same way as described above for the first to third transceivers other than that it is positioned opposite the third laser transceiver 350. It will further be appreciated, that the crop container monitor 320 may comprise further pairs of laser transceivers positioned on the front and rear walls 336, 338 to provide further lateral resolution of the crop pile. It will be appreciated that each of the second to fourth laser transceivers may comprise the same structural and functional features as the first laser transceiver 322.

Although, the crop container monitor 320 has been described with laser transceivers on the front and/or rear walls 336, 338, it will be appreciated that in some embodiments, one or more laser transceivers may be (alternatively or additionally) positioned on the sidewalls 344, 346. For example, a series of laser transceivers positioned along one or both sidewalls 344, 346 may monitor "front to rear" or "rear to front" filling.

In this example, the crop container monitor 320 further comprises a first position sensor 356 and a second position sensor 358 in the form of GPS sensors. The first position sensor 356 is positioned at the intersection of the second wall 338 and the fourth wall 346. The second position sensor 358 is positioned at the intersection of the first wall 336 and the third wall 344. The controller 324 can receive the container positioning data from the first and second position sensors 356, 358. By providing two position sensors 356, 358, the controller can estimate a pose of the container 308 from a single measurement from both position sensors 356, 358. In other examples, the pose can be estimated from a single position sensor by monitoring the change in position measurement over time. The controller 324 can receive the tube positioning data from a tube position sensor 360 positioned on the unloading tube 312. The controller 324 can further receive the harvester positioning data from one or more harvester position sensors (not shown) positioned on the harvesting machine. The controller 324 may estimate the position and/or orientation of the container 308 relative to the harvesting machine and/or unloading tube 312 (the positioning state) based on signals from the one or more harvester position sensors, the tube position sensor and the first and second position sensors 356, 358.

The controller 324 may determine a portion of the container 308 being filled to be full or nearly full, based on the fill-state and the positioning state. For example, in a single laser transceiver system the fill-state may indicate that a first portion of the container 308 from 5 metres to 7 metres from the front of the container is full and a second portion from 0 meters to 5 metres is not full (i.e. the propagation distance is 5 metres indicating that the harvested crop 332 exceeds the threshold height (as illustrated)). Meanwhile, the positioning state may indicate that the unloading tube 312 is positioned at 5.5 metres from the front of the container 308, over the first portion (not as illustrated). The controller 224 may output the current filling status indicating that the harvested crop 332 exceeds the threshold height at the portion of the container currently being filled. In response, the controller 324 may determine a new unloading position for the container 308 or a new position and/or orientation of the container relative to the unloading tube 312 and/or harvesting machine. The controller 324 may output the new relative position/orientation to one or more agricultural vehicles, for example to the display unit of the tractor or harvesting machine. The controller 324 may output control signals to a control system of the agricultural vehicle for controlling the agricultural machine such that the new position/orientation is reached. Furthermore, if the current filling status indicates the portion of the container 308 being filed is not full, the controller 324 may continually monitor the fill-state and the position/orientation of the container 308 relative to the harvesting machine and/or unloading tube 312 and output the control signals to the harvesting machine and/or truck/tractor to maintain a constant relative position/orientation while a particular portion is being filled. This can advantageously avoid a drift in the relative position due to any relative motion of the harvesting machine and the truck/tractor. In this way, the controller 324 can monitor and automatically adjust a distance between the container 308 and the harvesting machine (based on the position state and the fill-state) thereby realising automatic filling of the container 308.

In some examples, the new position/orientation may correspond to a new relative lateral position of the unloading tube 312 if the first and third propagation distances indicate off-centre filling. In some examples, the new position may be a new relative longitudinal position of the unloading tube 312 towards the front or back of the container 308 in the direction of filling. In some examples, the crop container monitor 320 may further comprise a wind speed sensor. The controller 324 may receive wind speed data from the wind speed sensor and include an offset in the determined new position/orientation based on the wind speed, to allow for blowing of crop as it falls from the unloading tube 312.

In some examples, the monitor 320 may comprise one or more further sensors positioned along the side edges of the container to detect where the crop is too close to the edge and exceeds the threshold height. The controller 324 may determine the fill-state based on signals from the one or more further sensors. The fill-state may indicate that the filling should stop at the current unloading position. The one or more further sensors may comprise tactile, optical or capacitive sensors.

Although, the embodiment of FIG. 3 is described with laser transceivers, it will be appreciated that other radiation transceivers could be employed in place of the laser transceivers. For example, the first, second, third and fourth radiation sensors may lidar transceivers, ultrasonic transceivers or radar transceivers and perform the same time of flight measurements.

Figure 4:
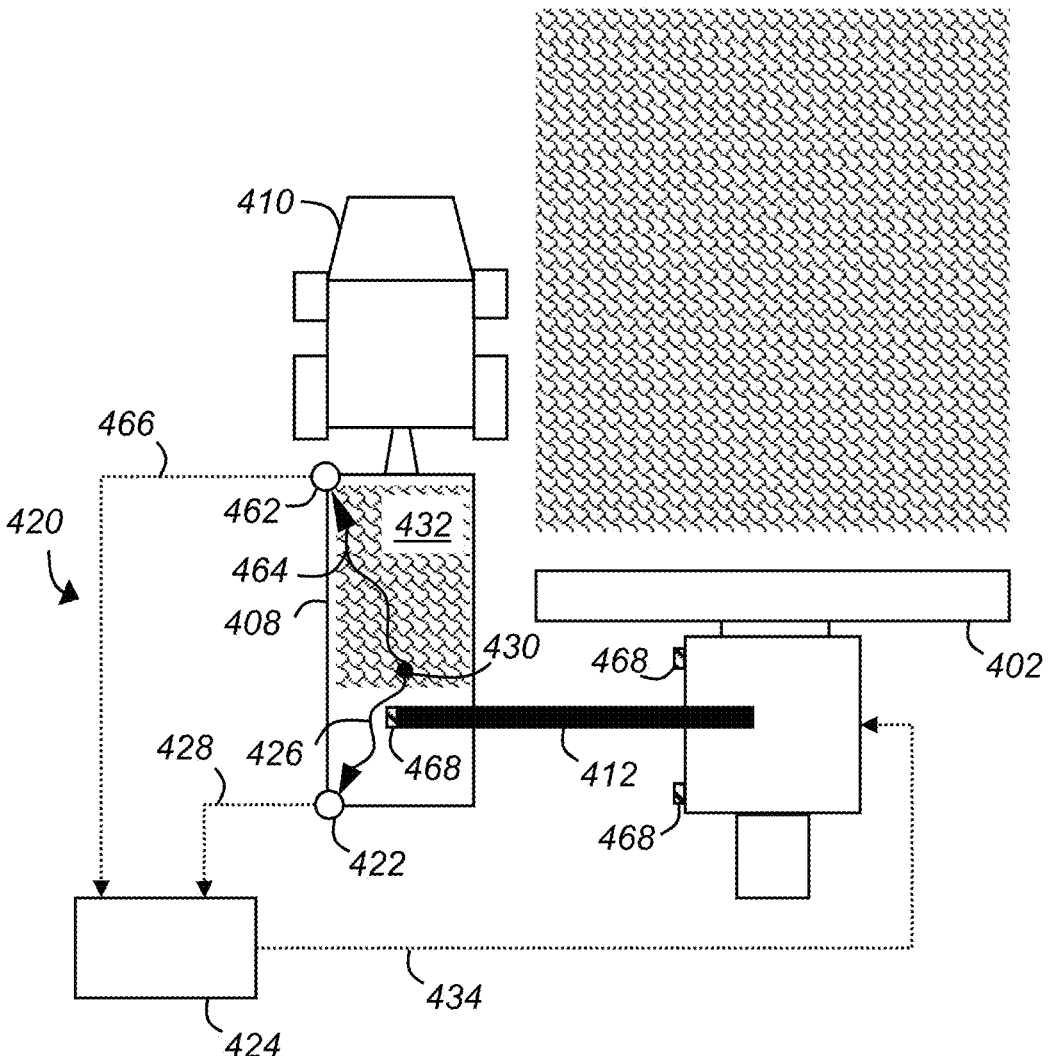
FIG. 4 illustrates a yet further crop container monitor for monitoring a fill-state of an open-top crop container during a harvesting operation according to an embodiment of the present disclosure.

FIG. 4 illustrates a further crop container monitor 420 for monitoring a fill-state of an open-top crop container 408 during a harvesting operation according to an embodiment of the present disclosure. Features of FIG. 4 that are also present in FIG. 1, 2 or 3 have been given corresponding numbers in the 400 series and will not necessarily be described again here. In this example, the container 408 comprises a trailer towed by a tractor 410.

In this example, the crop container monitor 420 comprises a first radiation sensor 422 and a second radiation sensor 462. The first radiation sensor 422 is positioned at an upper end of a wall of the container 408 in a first sensor position and the second radiation sensor 462 is positioned at an upper end of a wall (which may the same wall or a different wall) of the container 408 in a second sensor position different to the first sensor position. In other words, the second radiation sensor 462 is spaced apart from the first radiation sensor 422. The first radiation sensor 422 receives a first radiation signal from an interior of the container 408 and the second radiation sensor receives a second radiation signal 464 from the interior of the container 408. The controller 424 receives a first sensing signal 428, representative of the first radiation signal 426, from the first radiation sensor and a second sensing signal 466, representative of the second radiation signal 464, from the second radiation sensor 462. The controller 424 can determine a range profile of the container 408 based on the first sensing signal 428, the second sensing signal 466 and relative positions of the first and second radiation sensors 422, 462 on the container 408. The controller 424 may output the fill-state 434 based on the range profile.

The controller 424 may combine or fuse the first and second sensing signals 428, 466, to provide the range profile. The range profile may comprise a stereo profile representing distances to a plurality of points 430 from which the first and second radiation signals are received. In other words, the crop container monitor 420 may perform range imaging based on the spatially separated first and second radiation sensors 422, 462 receiving corresponding radiation signals 426, 464 from the same plurality of points 430 internal to the container 408.

The first and second radiation sensors 422, 462 may each comprise any of: a light detection and ranging (LiDAR) transceiver, a radio detection and ranging (RADAR) transceiver, an ultrasonic transceiver, a stereo camera or a camera. LiDAR transceivers can be particularly advantageous because it has a highly resolute point cloud due to the small point size of the light source (typically a laser). RADAR transceivers can be particularly advantageous by being robust to dust by providing good detection through the dusty environment of a harvesting operation. Furthermore, newer 4D RADAR transceivers can provide a point cloud with sufficient resolution for fill sensing.

A LIDAR transceiver, RADAR transceiver and ultrasonic transceiver may comprise a corresponding transmitter for emitting a radiation signal and a corresponding receiver for receiving the reflected or scattered radiation signal. The emitted radiation signal may illuminate the plurality of points (including points within the interior of the container 408) within a field of view of the receiver. The range profile may comprise a 3D point cloud or a stereo image depending upon the type of sensor used. For example, the range profile may comprise a 3D point cloud, when the first and second radiation sensors 422, 462 comprise LiDAR transceivers, or may comprise a stereo image, when the first and second radiation sensors 422, 462 comprise cameras. A camera or a stereo camera may operate at a visible and/or infrared wavelength. In some examples, the crop container monitor 420 may comprise different types of sensors 422, 462 and perform sensor fusion. For example, the controller 424 may output a fill-state comprising a stereo camera image with an overlay of a LiDAR 3D point cloud. Such a visual may be particularly advantageous to an operator, particularly in high dust conditions.

In some examples, the controller 424 may output the fill-state by outputting the range profile. For example, the controller 424 may output a camera image or a 3D point cloud (such as those of FIGS. 6 to 8) to a display screen of the harvesting machine 402 and/or tractor 410.

In some examples, the controller 424 may estimate a crop distribution of the harvested crop 432 in the container 408 based on the range profile. In some examples, the controller 424 may determine a scale of the range profile. The controller 424 may determine a scale and orientation of the range profile based on the positions or separation of the first and second radiation sensors and/or one or more reference features in the range profile. The one or more reference features may include physical features of the container such as one or more edges and/or apexes. The one or more reference features may also comprise one or more container targets as described below. The controller may identify the reference features using known image processing techniques. The controller 424 may determine points corresponding to an interior of the container 408 by identifying the one or more reference features. The controller 424 may determine 3D positions of each point in the range profile based on the scale and orientation. The controller 424 may define the 3D positions with reference to axes of a coordinate system, for example a cartesian coordinate system with an origin at a corner of the container 408 or at a position of one of the sensors 422, 462. The controller 424 may determine the crop distribution based on the 3D positions of a plurality of scatter/reflection points 430 inside the container. For example, if a vertical axis is aligned perpendicular to a floor of the container, the controller 424 may use a height of each point (in the direction of the vertical axis) within the container 408 to determine a spatial distribution of the harvested crop 432 within the container. The controller 424 may compare the height of each point 430 with the threshold height to determine portions of the container that are full or not full.

In some examples, the controller 424 may estimate a crop spillage outside the container 408 based on the range profile. The controller 424 may estimate the spillage by using reference features in the same way as outlined above for the crop distribution. The controller may identify and/or estimate the crop spillage outside the container 408 based on reference features identifying the container walls or edges and identifying a crop flow (which may be identified as a discontinuous disruption to the point profile (see FIG. 8)) outside the container walls. The controller 424 may identify spillage on a side of the container 408 between the container 408 and the harvesting machine 402 or on a side of the container away from the harvesting machine 402.

In some examples, the controller 424 may estimate a position of a crop flow and/or a crop flow impact point based on the range profile and output the crop flow impact point as part of the fill-state and/or the position state. The controller 424 may estimate the position of the crop flow by identifying features in the range profile such as the position of the unloading tube 412 (which may be a reference feature) and/or identifying a shape typical of the crop flow, for example, a substantially columnar shape extending between the unloading tube 412 and a surface of the crop distribution. The controller 424 may estimate the crop flow impact point by monitoring a rate of change of the range profile and determining the crop impact point to be where a height of one or more points in the range profile is increasing fastest. The controller may also estimate the position of the crop flow and/or crop flow impact point using other image processing techniques such as machine learning. The controller 424 may determine the portion of the container 408 being filled as the crop impact point and output the current filling status based on a height of the crop impact point. The controller 424 may determine a new relative position/orientation for the unloading tube 412 and/or the harvesting machine 402 and/or determine the one or more control signals based on the position of the crop flow, crop flow impact point, the current filling status and/or the positioning state.

In some examples, the first and second radiation sensors 422, 462 may be positioned at the upper end of the walls of the container 408 such that both sensors have a field of view encompassing the interior of the container 408 and at least a portion of the harvesting machine 402. For example, as illustrated, both sensors 422, 462 may be positioned on a side of the container 408 away from the harvesting machine 402, such that a field of view towards the harvesting machine 402 includes the interior of the container 408 and the harvesting machine 402. In this example, each of the first and second radiation sensors 422, 462 are positioned at a respective corner of the container 408. In some examples, the first and second radiation sensors 422, 462 may include mounts for raising the sensors 422, 462 to a height above an upper edge of the walls of the container 408 such that the field of view of the transceivers is improved.

With a field of view of the sensors 422, 462 encompassing both the interior of the container 408 and a portion of the harvesting machine 402, the controller 424 may determine a range profile including the container 408 and the portion of the harvesting machine 402. The controller 424 may estimate the position state, representative of the position and/or orientation of the container 408 relative to the harvesting machine 402 and/or unloading tube 412, based on a position of the harvesting machine in the range profile. The controller may determine points of the 3D image profile corresponding to the harvesting machine 402 by identifying one or more reference features (such as edges, apexes or harvester targets 468) of the portion of the harvesting machine 402. The controller 424 may determine the 3D position of the points of the range profile corresponding to the harvesting machine using the scale and orientation. The controller may determine the positioning state based on the 3D positions of the portion of the harvesting machine 402 and 3D positions of the container 408. The controller 424 may output the position state or control signals for controlling an agricultural vehicle in the same way as described above in relation to FIGS. 2 and 3.

In some examples, the crop container monitor 420 may comprise one or more harvester targets 468 for positioning on the harvesting machine 402. The one or more harvester targets 468 may comprise a beacon (for camera based sensors) or a highly reflective material (for transceiver based sensors). The one or more harvester targets may improve a signal to noise ratio for radiation signals coming from the harvesting machine. As a result, the controller may estimate the position and/or orientation of the container 408 relative to the harvesting machine 402 and/or unloading tube 412 with greater accuracy. The one or more harvester targets 468 may also provide corresponding reference positions for calibrating a scale, position or orientation of the harvesting machine 402 in the range profile.

In some examples, the crop container monitor 420 may comprise one or more container targets (not shown) for positioning at reference positions on the container 408. The one or more container targets may comprise a beacon (for camera based sensors) or a highly reflective material (for transceiver based sensors), including corner cubes and/or radar reflectors. The one or more container targets may provide corresponding reference positions for identifying a physical feature (such as an edge or apex) of the container. The controller 424 may calibrate a scale and/or orientation of the range profile based on the position of the one or more container targets in the range profile, as described above.

It will be appreciated that, in some examples, the crop container monitor 420 of FIG. 4 may not determine the fill state 434 and may only estimate the position state, representative of the position and/or orientation of the container 408 relative to the harvesting machine 402 and/or unloading tube 412, as described above.

Figure 5:
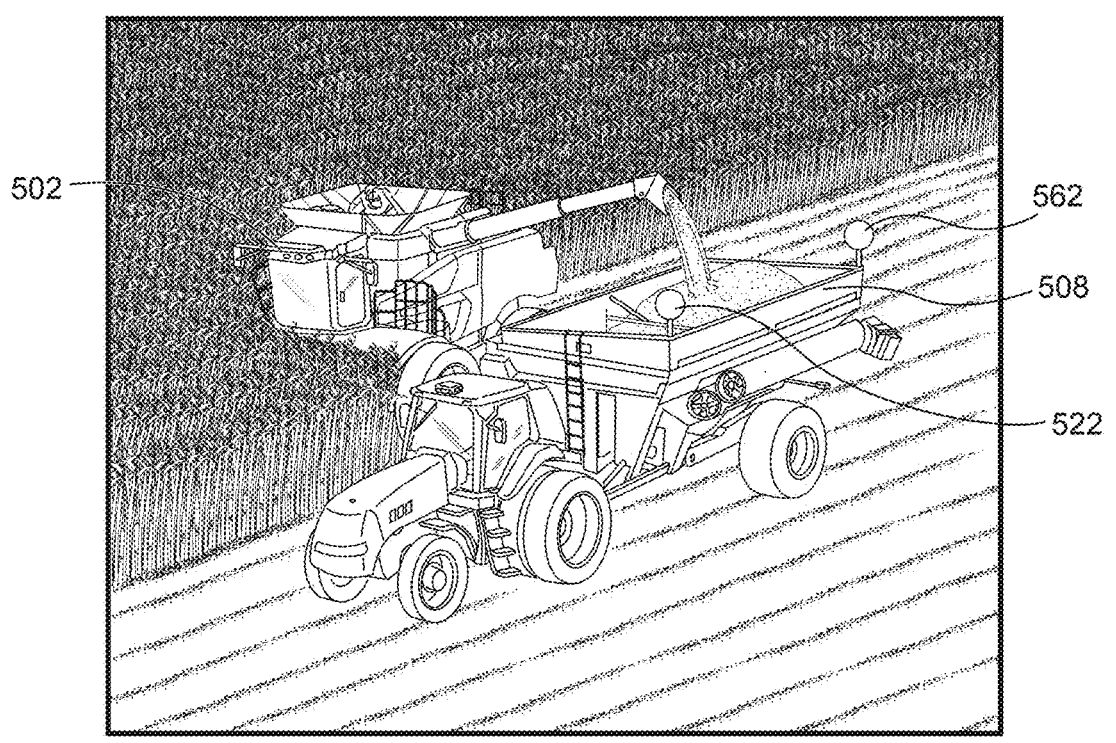
FIG. 5 illustrates example positioning of first and second radiation sensors each comprising a LiDAR sensor in a crop container monitor according to an embodiment of the present disclosure.
Figure 6:
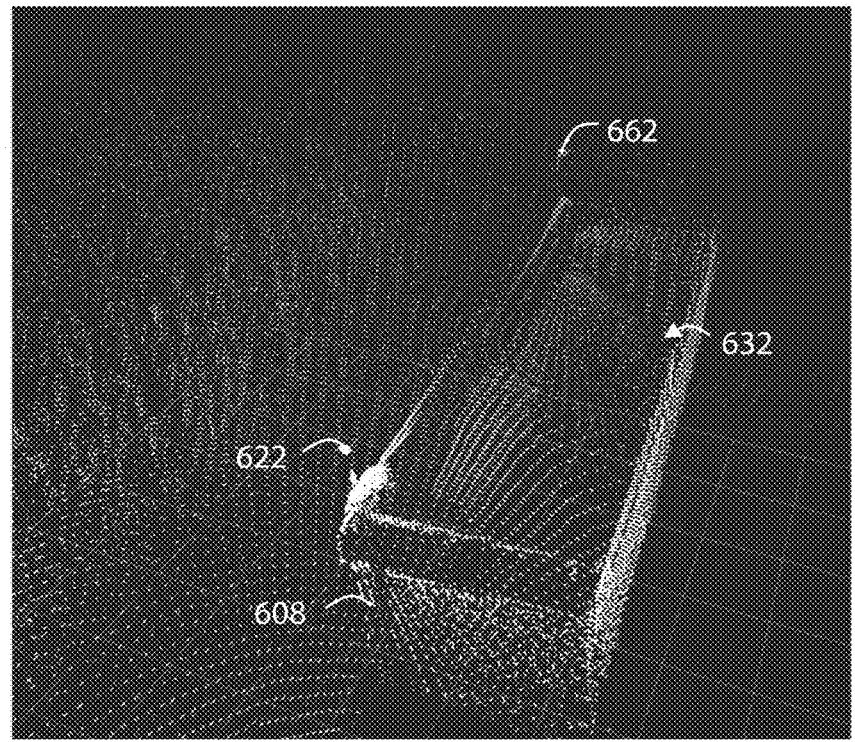
FIG. 6 illustrates a range profile comprising a 3D point profile provided by a crop container monitor comprising first and second lidar transceivers positioned as illustrated in FIGS. 4 and 5.
Figure 7:
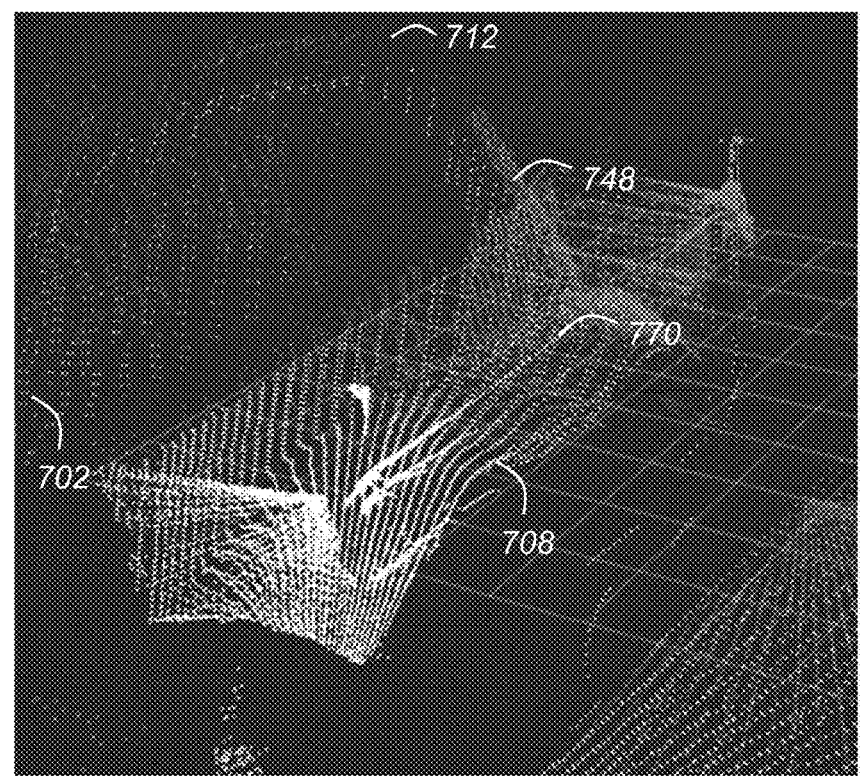
FIG. 7 illustrates another range profile comprising a 3D point profile provided by a crop container monitor comprising first and second lidar transceivers positioned as illustrated in FIGS. 4 and 5.
Figure 8:
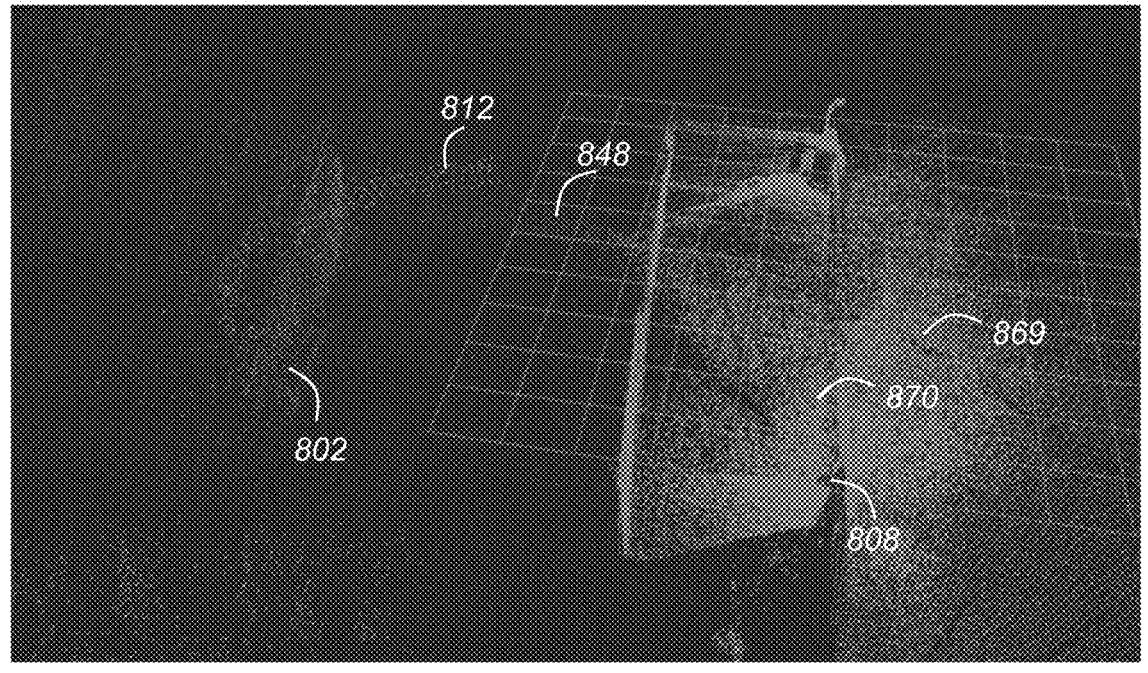
FIG. 8 illustrates another range profile comprising a 3D point profile provided by a crop container monitor comprising first and second lidar transceivers positioned as illustrated in FIGS. 4 and 5.

FIG. 5 illustrates example positioning of first and second radiation sensors 522, 562 each comprising a LiDAR sensor in a crop container monitor according to an embodiment of the present disclosure. FIGS. 6 to 8 illustrate corresponding 3D point clouds obtained by a LiDAR based crop container monitor according to an embodiment of the present disclosure. Features of FIGS. 5 to 8 that are also present in any of FIGS. 1 to 4 have been given corresponding numbers in the 500, 600, 700 and 800 series and will not necessarily be described again here.

FIG. 5 illustrates example positioning of first and second radiation sensors 522, 562 each comprising a LiDAR sensor on the container 508. The container 508 comprises a trailer receiving grain from a combine harvester 502 during a harvesting operation. The LiDAR sensors 522, 562 are positioned on the side of the trailer 508 away from the harvester and comprise mounts to raise them above the upper edge of the sidewall such that their field of view encompasses the interior of the container 508 and the harvester 502.

Figure 10:
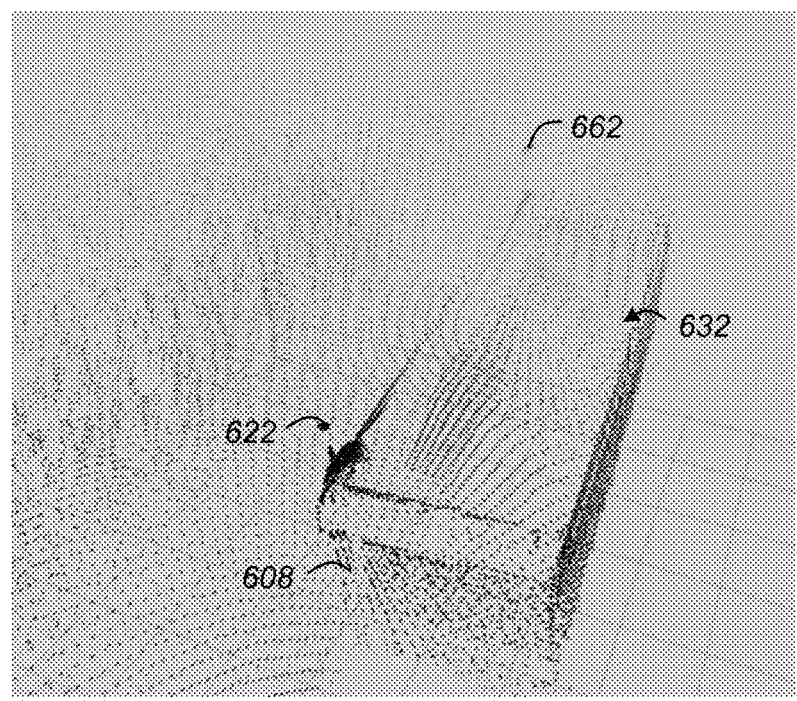
FIG. 10 is a colour inversion of FIG. 6.

FIG. 6 illustrates a range profile comprising a 3D point profile provided by a crop container monitor comprising first and second lidar transceivers positioned as illustrated in FIGS. 4 and 5. The container 608, the first and second LiDAR sensors 622, 662 and the crop distribution of harvested crop 632 can all clearly be seen in the range profile. As described above, the controller may perform image processing to extract the crop distribution from the range profile. The controller may output the fill-state and/or determine control signals etc, as described above in relation to FIGS. 2 to 4. FIG. 10 is a colour inversion of FIG. 6 in which some features may be more easily identified.

Figure 11:
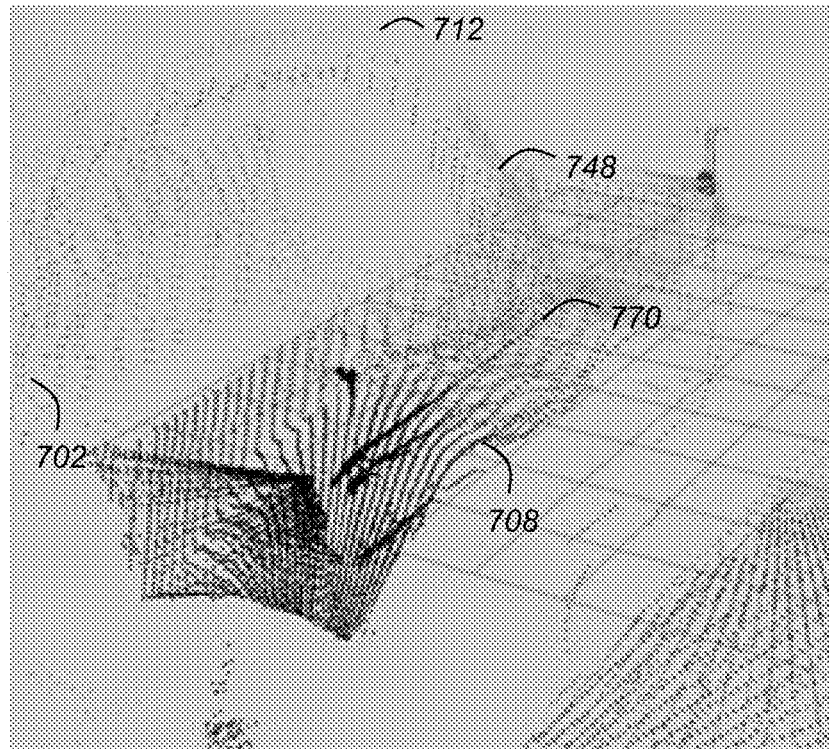
FIG. 11 is a colour inversion of FIG. 7.
Figure 12:
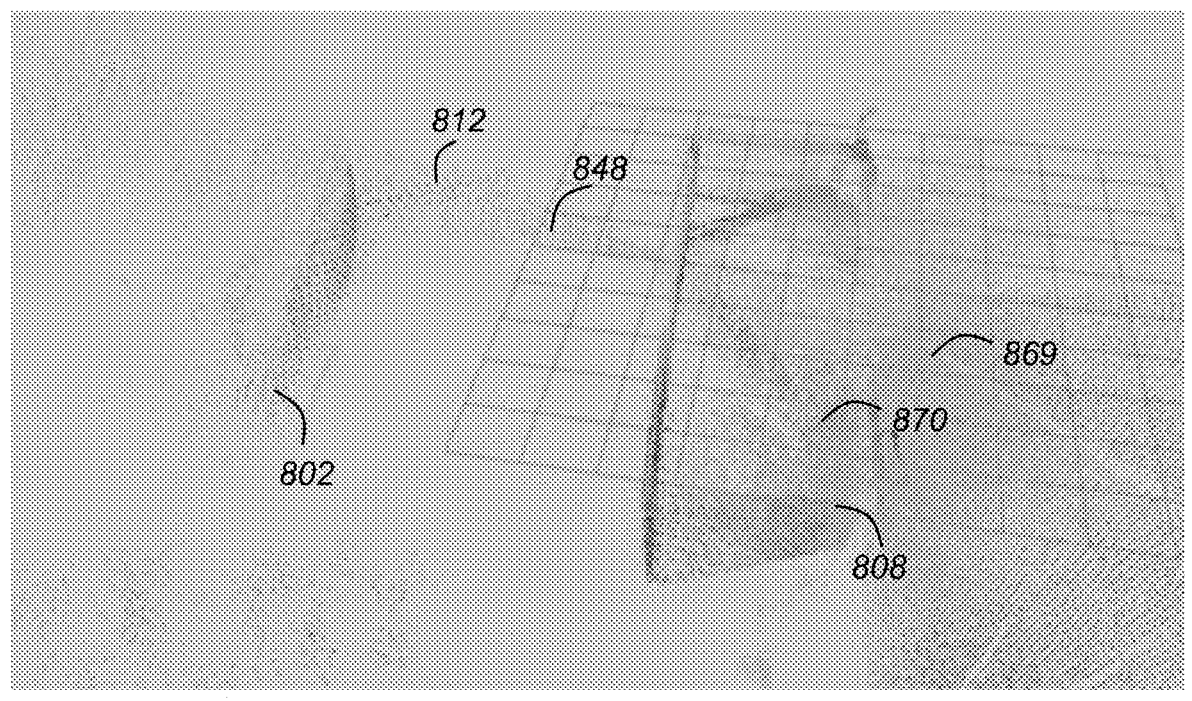
FIG. 12 is a colour inversion of FIG. 8.

FIGS. 7 and 8 illustrate further range profiles comprising 3D point profiles provided by a crop container monitor comprising first and second lidar transceivers positioned as illustrated in FIGS. 4 and 5. The container 708, 808, the harvesting machine 702, 802, the unloading tube 712, 812, the crop flow 748, 848 and the crop flow impact point 770, 870 can all clearly be seen in the range profile. Crop spillage can also be seen in FIG. 8. As described above, the controller may perform image processing to extract the crop distribution, the crop flow 748, 848, the crop flow impact point 770, 870, crop spillage 869 and/or the position and/or orientation of the container 708, 808 relative to the harvesting machine 702, 802 and/or unloading tube 712, 812 from the range profile. In some examples, the controller may identify one or more distinct features such as edges of the container or the targets as part of the image processing. In some examples, the controller may perform the image processing using a machine learning algorithm trained on annotated images in which features, such as the crop distribution, the crop flow impact point 770, 870, the container 708, 808, the harvesting machine 702, 802 and the unloading tube 712, 812, are labelled. The controller may output the fill-state, position state and/or determine control signals etc, as described above in relation to FIGS. 2 to 4. FIGS. 11 and 12 are respective colour inversions of FIGS. 7 and 8 in which some features may be more easily identified.

It will be appreciated that the 3D point clouds illustrated in FIGS. 6 to 8 (and 10 to 12) have been converted from colour images to black and white colouring. The 3D point clouds may include additional information such as: an intensity or magnitude of each point representing a signal strength, a signal to noise ratio, a Doppler speed, a distance, etc, depending on the type of radiation sensor. The additional information can be associated with each point and illustrated as a colour gradient in a displayed range profile or point cloud.

Figure 9:
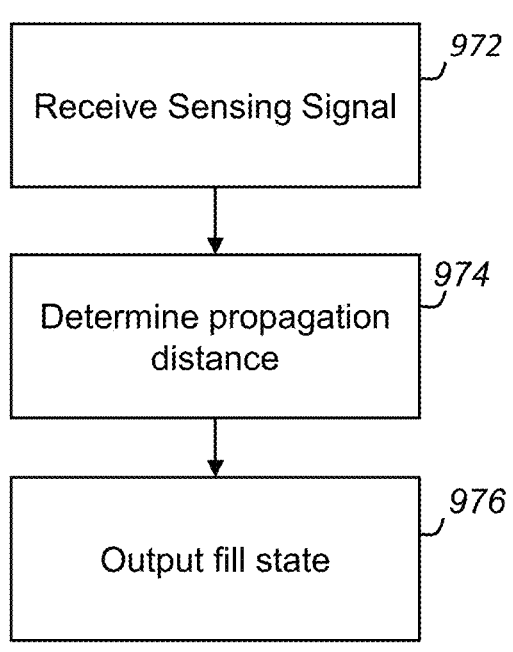
FIG. 9 illustrates a method of monitoring a fill-state of an open-top crop container according to an embodiment of the present disclosure.

FIG. 9 illustrates a method of monitoring a fill-state of an open-top crop container according to an embodiment of the present disclosure.

A first step 972 comprises receiving a sensing signal from at least one radiation sensor positioned at an upper end of a wall of the open-top crop container, wherein the sensing signal is representative of radiation received from an interior of the open-top crop container. A second step 974 comprises determining a propagation distance from the at least one radiation sensor to a point from which the received radiation was scattered, reflected or emitted, based on the sensing signal. A third step comprises outputting a fill-state of the open-top crop container based on the propagation distance.

Although the embodiments of FIGS. 2 to 9 describe a crop container monitor for monitoring a fill state of an open-top crop container being filled by a harvesting machine, it will be appreciated that the present disclosure is not limited thereto. The harvesting machine is an example of a harvesting vehicle. A grain cart may also be considered as a harvesting vehicle. The disclosed crop container monitor may also be employed on an open-top crop container of a road truck being filled by a grain cart (for example a heavy goods vehicle being filled by a grain cart 116 at the delivery point 114 as described above in relation to FIG. 1).

Throughout the present specification, the descriptors relating to relative orientation and position, such as "horizontal", "vertical", "top", "bottom" and "side", are used in the sense of the orientation of the apparatus as presented in the drawings. However, such descriptors are not intended to be in any way limiting to an intended use of the described or claimed invention.

It will be appreciated that any reference to "close to", "before", "shortly before", "after" "shortly after", "higher than", or "lower than", etc, can refer to the parameter in question being less than or greater than a threshold value, or between two threshold values, depending upon the context.

The invention claimed is:

1. A crop container monitor for monitoring a fill-state during a harvesting operation, the crop container monitor comprising:
   an open-top crop container comprising a first wall, a second wall opposite the first wall, a third wall extending between the first wall and the second wall, and a fourth wall opposite the third wall and extending between the first wall and the second wall such that the first wall, the second wall, the third wall, and the fourth wall define an opening at a top of the open-top crop container through which harvested crop discharged from a harvesting vehicle enters and interior of the open-top crop container;
   at least one radiation sensor positioned at an upper end of one of the first wall, the second wall, the third wall, or the fourth wall of the open-top crop container to receive radiation reflected off the harvested crop within the interior of the open-top crop container; and
   a controller that:
      receives a sensing signal from the at least one radiation sensor, wherein the sensing signal is representative of the received radiation;
      determines a propagation distance from the at least one radiation sensor to a point from which the received radiation was scattered, reflected, or emitted by the harvested crop within the interior of the open-top crop container based on the sensing signal; and
      outputs the fill-state of the harvested crop within the interior of the open-top crop container based on the propagation distance.

2. The crop container monitor of claim 1, wherein the controller:
   receives a position and/or an orientation of the open-top crop container relative to the harvesting vehicle and/or an unloading tube of the harvesting vehicle; and outputs a positioning state, representative of the relative position and/or orientation, with the fill-state.

3. The crop container monitor of claim 2, wherein the controller:
   determines if the harvested crop in a portion of the interior of the container being filled exceeds a threshold height based on the fill-state and the positioning state; and
   outputs a current filling status, representative of whether the harvested crop exceeds the threshold height, with the fill-state and the positioning state.

4. The crop container monitor of claim 2, wherein the controller:
   determines one or more control signals for controlling an agricultural vehicle associated with the harvesting operation based on the fill-state and the positioning state; and
   outputs the control signals for controlling the agricultural vehicle.

5. The crop container monitor of claim 1, wherein the at least one radiation sensor comprises a radiation transceiver that:
   emits a radiation signal; and
   receives the radiation signal reflected back towards the radiation transceiver by the harvested crop within the interior of the open-top crop container, wherein the controller determines the propagation distance based on a time of flight of the radiation signal.

6. The crop container monitor of claim 5, wherein the radiation transceiver is positioned at the upper end of the first wall of the open-top crop container and emits the radiation signal towards the second wall of the open-top crop container.

7. The crop container monitor of claim 6, wherein:
   the open-top crop container further comprises a trailer or a truck for positioning adjacent to the harvesting vehicle during the harvesting operation to receive the harvested crop from the harvesting vehicle;
   the first wall or the second wall is a front wall of the trailer or truck; and
   the other one of the first wall or the second wall is a rear wall of the trailer or truck.

8. The crop container monitor of claim 6, wherein:
   the radiation transceiver is positioned at an end of the first wall connecting to the third wall of the open-top crop container.

9. The crop container monitor of claim 8, wherein:
   the at least one radiation sensor further comprises a second radiation transceiver positioned at the upper end of the second wall that emits a second radiation signal towards the first wall and receives the second radiation signal reflected back towards the second radiation transceiver by the harvested crop material within the interior of the open-top crop container;
   the second radiation transceiver is positioned at the end of the second wall connecting to the third wall; and
   the controller determines a second propagation distance based on a time of flight of the second radiation signal and determines the fill-state of the harvested crop within the interior of the open-top crop container based on the second propagation distance.

10. The crop container monitor of claim 8, wherein the at least one radiation sensor further comprises a third radiation transceiver positioned at the upper end of the first wall or the second wall that emits a third radiation signal towards the other one of the first wall and the second wall and receives the radiation signal reflected back towards the third radiation transceiver by the harvested crop material within the interior of the open-top crop container, wherein the third radiation transceiver is positioned at an end of the first wall or the second wall connecting to the fourth wall, and wherein the controller determines a third propagation distance based on a time of flight of the third radiation signal and determines the fill-state of the harvested crop within the interior of the open-top crop container based on the third propagation distance.

11. The crop container monitor of claim 5, wherein the radiation transceiver comprises a laser transceiver.

12. The crop container monitor of claim 1, wherein the at least one radiation sensor comprises a first radiation sensor and a second radiation sensor, and wherein the controller:

determines a range profile of the harvested crop within the interior of the open-top crop container based on a first sensing signal from the first radiation sensor, a second sensing signal from the second radiation sensor, and relative positions of the first radiation sensor and the second radiation sensor on the open-top crop container; and outputs the fill-state based on the range profile.

13. The crop container monitor of claim 12, wherein the controller estimates a crop distribution of the harvested crop within the interior of the open-top crop container based on the range profile and outputs the fill-state based on the crop distribution.

14. The crop container monitor of claim 12, wherein the controller identifies or estimates a crop spillage of the harvested crop material outside the open-top crop container based on the range profile and outputs the crop spillage as part of the fill-state.

15. The crop container monitor of claim 12, wherein the range profile comprises a 3D point cloud or a range image.

16. The crop container monitor of claim 12, wherein the first and second radiation sensors comprise any of: a LiDAR transceiver, a RADAR transceiver, an ultrasonic transceiver, a stereo camera, or a camera.

17. The crop container monitor of claim 12, wherein the first radiation sensor is positioned at the upper end of one of the first wall, the second wall, the third wall, or the fourth wall of the open-top crop container and the second radiation sensor is positioned at the upper end of another of the first wall, the second wall, the third wall, or the fourth wall of the open-top crop container such that the first radiation sensor is spaced apart from the second radiation sensor.

18. The crop container monitor of claim 17, wherein:

the open-top crop container comprises a trailer or a truck for positioning adjacent to the harvesting vehicle during the harvesting operation to receive the harvested crop from the harvesting vehicle;

the first radiation sensor and the second radiation sensor are positioned on the open-top crop container to provide a field of view of the first radiation sensor and a field of view of the second radiation sensor, respectively, for capturing a portion of the harvesting vehicle during the harvesting operation; and the controller:

determines a range profile of the harvested crop within the interior of the open-top crop container and the portion of the harvesting vehicle;

estimates a position and/or orientation of the open-top crop container relative to the harvesting vehicle and/or an unloading tube of the harvesting vehicle based on a position of the harvesting machine in the range profile; and outputs a positioning state representative of the relative position and/or orientation.

19. The crop container monitor of claim 18, further comprising one or more targets for positioning on the portion of the harvesting vehicle, wherein the controller estimates the position and/or orientation of the open-top crop container relative to the harvesting vehicle based on a position of the one or more targets in the range profile.

20. A method of monitoring a fill-state of an open-top crop container, the method comprising:

receiving a sensing signal from at least one radiation sensor positioned at an upper end of one of the first wall, the second wall, the third wall, and the fourth wall of the open-top crop container, wherein the sensing signal is representative of radiation received from harvested crop within an interior of the open-top crop container;

determining a propagation distance from the at least one radiation sensor to a point from which the received radiation was scattered, reflected, or emitted by the harvested crop within the interior of the open-top crop container based on the sensing signal; and outputting a fill-state of the harvested crop within the interior of the open-top crop container based on the propagation distance.

* * * * *